United States Patent
Shiff

(10) Patent No.: US 7,835,694 B2
(45) Date of Patent: Nov. 16, 2010

(54) APPARATUS AND METHOD FOR REPEATER-BASED CELLULAR COVERAGE SWITCHING

(76) Inventor: Yoni Shiff, 12 Mivtza Nachshon Street, Rishon LeZion (IL) 75445

( * ) Notice: Subject to any disclaimer, the term of this patent is extended or adjusted under 35 U.S.C. 154(b) by 641 days.

(21) Appl. No.: 11/815,787

(22) PCT Filed: Aug. 23, 2005

(86) PCT No.: PCT/IL2005/000911

§ 371 (c)(1),
(2), (4) Date: Aug. 8, 2007

(87) PCT Pub. No.: WO2006/085297

PCT Pub. Date: Aug. 17, 2006

(65) Prior Publication Data

US 2009/0117899 A1 May 7, 2009

(30) Foreign Application Priority Data

Feb. 10, 2005 (IL) .................................. 166804

(51) Int. Cl.
*H04B 7/185* (2006.01)
(52) U.S. Cl. .................. 455/13.1; 455/11.1; 455/67.11; 455/524; 455/561; 455/453; 370/315
(58) Field of Classification Search .................. 455/464, 455/453, 436, 561, 562.1, 524, 22, 15, 20, 455/9, 456.4, 501, 11.1, 13.1, 16, 19, 525, 455/442, 68, 67.11; 370/229, 318, 335, 328, 370/230.1, 315
See application file for complete search history.

(56) References Cited

U.S. PATENT DOCUMENTS

| | | | |
|---|---|---|---|
| 5,541,979 A | 7/1996 | Leslie et al. | |
| 5,805,996 A * | 9/1998 | Salmela | 455/453 |
| 6,895,218 B2 * | 5/2005 | Yarkosky | 455/20 |
| 7,406,300 B2 * | 7/2008 | Pan | 455/111 |
| 2002/0045461 A1 | 4/2002 | Bongfeldt | |
| 2002/0082050 A1 | 6/2002 | Mountney et al. | |
| 2003/0104781 A1 * | 6/2003 | Son | 455/22 |
| 2005/0037798 A1 * | 2/2005 | Yamashita et al. | 455/525 |
| 2006/0165032 A1 * | 7/2006 | Hamalainen et al. | 370/328 |
| 2006/0166677 A1 * | 7/2006 | Derakshan et al. | 455/453 |
| 2009/0186632 A1 * | 7/2009 | Kennedy et al. | 455/456.5 |
| 2009/0215389 A1 * | 8/2009 | Alles et al. | 455/9 |

FOREIGN PATENT DOCUMENTS

| | | | |
|---|---|---|---|
| DE | EP1096817 A1 * | 5/2001 | |
| WO | WO 99/49598 A1 | 9/1999 | |
| WO | WO 0079704 A1 | 12/2000 | |
| WO | WO 2006/017983 A8 | 2/2006 | |

* cited by examiner

Primary Examiner—Sujatha Sharma
(74) Attorney, Agent, or Firm—Soroker-Agmon

(57) ABSTRACT

An apparatus and method for repeater-based cellular coverage switching across cellular donor sites in a wireless network is disclosed. The method involves measuring capacity load levels of cellular donor sites, determining cellular switching schemed based on the capacity loads establishing cellular switching configurations based on the cellular switching schemes, and performing cellular coverage switching to cellular donor sits.

19 Claims, 1 Drawing Sheet

APPARATUS AND METHOD FOR REPEATER-BASED CELLULAR COVERAGE SWITCHING

RELATED APPLICATION

The present invention is related and claims priority from Israeli application 166804 filed on Feb. 10, 2005 and titled "APPARATUS AND METHOD FOR TRAFFIC LOAD BALANCING IN WIRELESS NETWORKS", which is hereby incorporated by reference.

BACKGROUND OF THE INVENTION

1. Field of the Invention

The present invention relates to cellular communications networks in general and more particularly, to repeater-based cellular coverage switching across cellular donor sites or micro cellular sites.

2. Discussion of the Related Art

A known problem in repeater-based cellular coverage systems regards excessive traffic load on cellular donor sites. The problem is caused by the limited load capacity of a typical cellular site and the dynamic and difficult-to-predict traffic load directed to the cellular site by one or more repeaters. The problem is made more acute consequent to the insertion of additional repeaters into the cellular coverage system. Such repeaters are typically used to provide coverage to zones having coverage problems such as, for example, indoor spaces enclosed within massive architectural structures or outdoor areas where natural or man-made obstacles block the cellular signals. Typically, the new repeaters are set up and activated without consideration for the capacity loads of and the existing traffic load of cellular donor sites that are designed to provide service to the repeaters A typical repeater installed for a large architectural structure is connected to one or more external (donor) antennas and to one or more internal (null) antennas. At installation the directions of the donor antennas are pre-set such as to point at different cellular donor sites. In accordance with the specific network architecture the cellular donor site could handle simultaneously several repeaters as well as non-repeater-based traffic.

The traffic loads generated by the newly inserted repeater could be extremely varied. The variance could be based on the periods of the day. Thus, for example, in a nighttime entertainment center, such as a nightclub, located in the architectural structure served by the new repeater the volume of the cellular activity could widely differ between daylight hours and late nighttime hours, Depending on the load capacity of the cellular donor site during peak traffic periods the cellular traffic generated in the nighttime entertainment site could swamp the cellular donor site. The overload could cause substantial deterioration in the quality of the cellular service. Setting up of connections could be delayed and established connections could be terminated in an unwanted and unanticipated manner. On the other hand during the off-peak hours of the nighttime entertainment site it is possible that one or more adjacent cellular donor sites that are providing service for a daytime shopping center, for example, could be overloaded with heavy cellular traffic while the cellular donor site serving the nighttime entertainment site could be significantly under-utilized.

Thus, there is a need for a new apparatus and method to provide the capability for balancing the cellular traffic load across cellular donor sites. The load balancing will be achieved by cellular coverage switching or by dynamically re-routing cellular traffic between coverage zones and cellular donor sites. The traffic will be directed away from overloaded cellular donor sites during peak periods of cellular traffic periods towards other cellular donor sites that are under-utilized within the same period.

SUMMARY OF THE PRESENT INVENTION

One aspect of the present invention regards a method for repeater-based cellular coverage switching across cellular donor sites a cellular communications network. The method comprises: measuring the capacity load of several cellular donor sites, determining a cellular coverage switching scheme based on the measured capacity load of the cellular donor sites, setting up a cellular coverage switching configuration in accordance with the cellular coverage switching scheme, and switching the cellular traffic to a cellular donor site in accordance with the cellular coverage switching configuration.

A second aspect of the present invention regards an apparatus for repeater-based cellular coverage switching across cellular donor sites in a cellular communications network. The apparatus comprises a capacity load measuring device linked to the cellular transmission channels and to a system controller device for measuring capacity load of cellular donor sites and to transmit measurement information to a system controller device, a system controller device linked to the capacity load measuring device and to an antennas switch, to receive capacity load measurement information from the capacity load measuring device, to analyze the received information, to generate cellular coverage switching instructions, and to transmit the cellular coverage switching instructions to the antennas switch, and an antennas switch linked to the system controller device and to outdoor donor antennas to receive cellular coverage switching instructions from the system controller and for coverage switching of the cellular traffic to one or more cellular donor sites.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Figure 1:
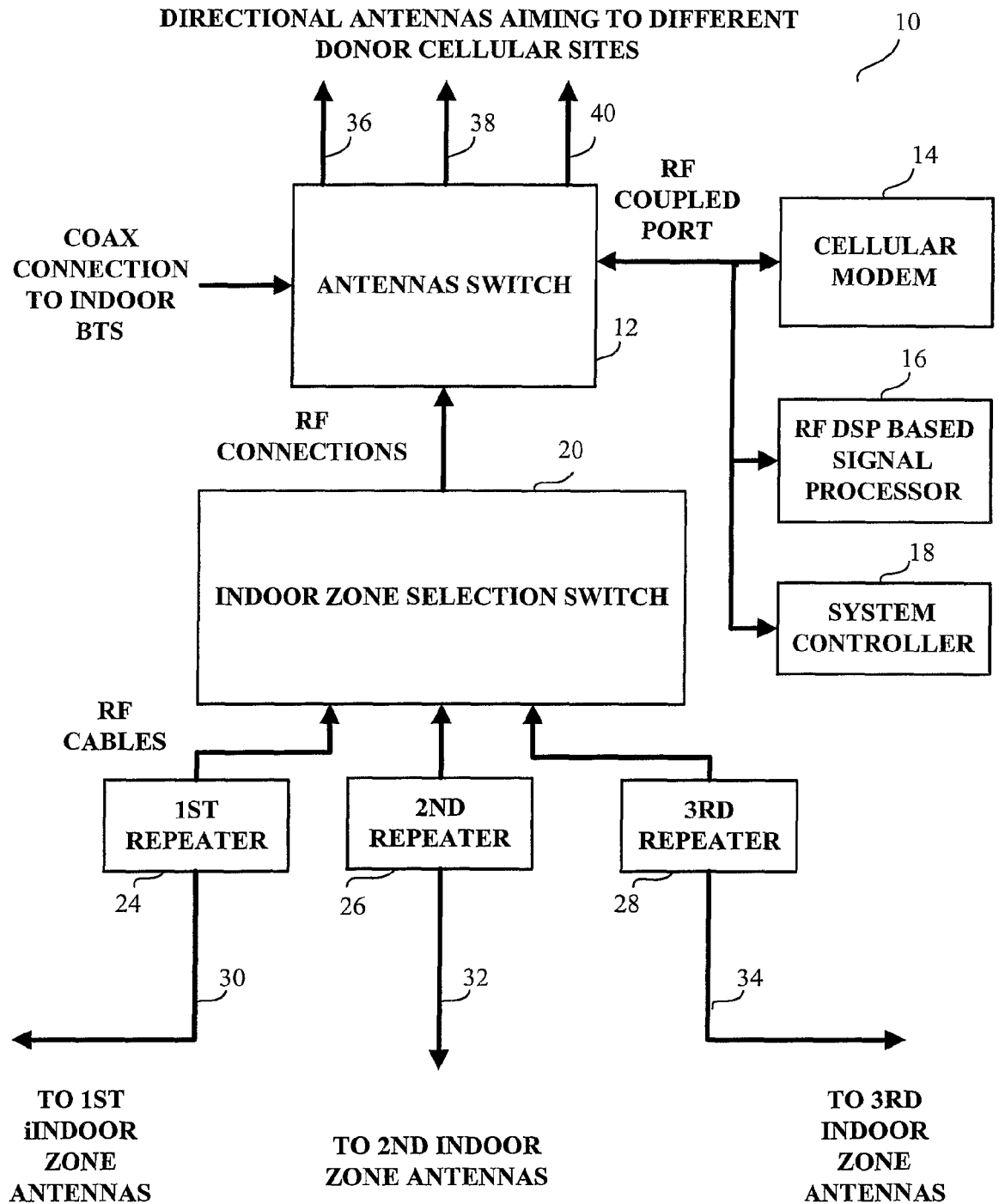
FIG. 1 is a schematic illustration of the apparatus for cellular coverage switching, in accordance with the preferred embodiment of the present invention.

An apparatus and method for balancing capacity load in repeater-based cellular coverage systems is disclosed. The proposed apparatus and method provide means for the routing of capacity sources, such as cellular donor sites or micro cellular sites, to cellular coverage antennas. Where a system of repeaters is used to provide cellular coverage to wide areas the proposed apparatus and method could be used to balance the cellular traffic load such as using less cellular sources for providing optimal coverage of all areas. The invention is based on the assumption that while each cellular donor site has fixed load capacity most cellular donor sites have a dynamically changing cellular traffic load where the extent of the load is based on various environmental and temporal parameters, such as the geographical or topological zone of the operation, time of the day, day of the week, zone type (residential, industrial, commercial) and the like. For example, cellular donor sites associated with industrial zones will have a substantially reduced traffic load in the evenings, unlike residential areas that will have more traffic load in the evenings. The present invention is related and claims priority from Israeli application 166804 filed on Feb. 10, 2005 and titled "APPARATUS AND METHOD FOR TRAFFIC LOAD BALANCING IN WIRELESS NETWORKS", which is hereby incorporated by reference.

The proposed method includes measuring the cellular traffic capacity of cellular donor sites servicing coverage zones associated with repeaters, measuring the actual cellular traffic load on the repeaters generated in coverage zones, dynamically determining the optimal cellular traffic routing patterns, and establishing switching patterns between the coverage zones and the cellular donor sites. The switching patterns are determined in accordance with the measured cellular capacity load of the donor sites in the downstream and the measured cellular traffic load in the upstream transmitted from mobile units operating in the coverage zones. The proposed capacity load balancing apparatus and method is capable of identifying the capacity load levels of several preferably neighboring pre-assigned cellular wireless donor sites.

In the preferred embodiments of the present invention the cellular capacity load is measured in one of two alternative ways. The capacity load of a cellular donor site can be measured by the apparatus of the present invention without being physically linked to the cellular donor site by utilizing a cellular modem device that transmits and receives cellular traffic between the cellular donor site and the coverage zone via a repeater. By the measurement of specific transmission value ratios, such as a current value against a maximum value, the capacity load of the cellular donor site can be determined. In the alternative, the capacity load could be measured on-site by monitoring the downstream traffic in the downlink (DL) channel. The measurements performed are being made on the basis of various factors that indicate the capacity load levels or traffic load levels. These can include for example in the uplink channel, the overall calls being made, through measurement of the overall signal in CDMA, or the number of calls being started and ended in TDMA. In other embodiments the measurement relates directly to the signal strength, the amount of data being transferred on the channel, the frequency of use of the channel, the number of users of the channel and the like.

Based on the measurements of the down linked cellular traffic received from cellular donor sites via one or more outdoor donor antennas the proposed apparatus determines the optimal switching patterns to be established between the repeater and one or more donor antennas. The proposed apparatus measures the capacity load level of one or more pre-assigned cellular donor sites and routes cellular traffic from coverage zones associated with the repeaters, such as indoor zones and/or outdoor zones to the one or more cellular donor sites. The apparatus could also measure the required capacity load for a coverage zone by measuring the upstream traffic in uplink (UL) channel. The capacity load measured for coverage zone as a weight parameter for a calculation that involves the capacity load of a cellular donor site against the capacity load of one or more alternative cellular donor sites. The calculation produces results that provide the option of determining optimal cellular traffic routing pattern which will associate specific cellular donor sites with specific coverage zones associated with repeaters. The use of the term "optimal" relates to achieving improved cellular traffic load over time when associating a number of cellular donor sites with specific coverage zones. The term "optimal" can also be understood as achieving enhanced system performance or enhanced system usage, or enabling better service to customers of cellular devices, as a result of the application of the traffic routing pattern between cellular donor sites and coverage zones. The term cellular or wireless devices applies to cellular or other wireless devices such as a cellular telephone, a wireless device having the ability to transmit or receive voice or data via an air or non-cable interface.

The apparatus samples the traffic load levels on two or more pre-assigned cellular donor sites and based on the capacity load level of the cellular donor sites the apparatus determines to which donor site the cellular traffic from the repeater will be routed. The apparatus is further capable of examining the traffic load of a coverage zone. If the result indicates under-capacity of the cellular donor site then the coverage zone serviced by the cellular donor site could be fragmented into two or more sub-zones where each sub-zone will be covered by a different cellular donor site that will provide the required portion of the capacity load. In the following example, within a large retail complex containing stores and restaurants in adjacent buildings or in a single large building, a shopping mall and a nighttime entertainment center, such as for example, a nightclub operates. During daytime hours the shopping mall, including the nightclub, receives cellular coverage from a first cellular donor site. At night the cellular traffic load from the shopping mall intensifies as a result of an increased number of cellular calls being established and being performed at the nightclub. Consequently, the cellular traffic load on the first cellular donor site steeply increases. The problem is solved by the operation of the proposed method supported by the proposed apparatus. As a result of the operation, the repeater device re-routs the cellular traffic initiated and performed in the shopping mall from the first cellular donor site to a second cellular donor site which is under-utilized. In addition, the cellular traffic of the nightclub is decoupled from the cellular traffic of the shopping mall and is re-routed to a third under-utilized cellular donor site. It will be readily appreciated that the example shown above is in no way limiting and that other establishments and time of operation can similarly apply. Persons skilled in the art will appreciate that many other situations not shown herein can also be applied to the usage and purpose of the present invention. Such can include for a non-limiting example, usage of the system in locations having different usage of wireless devices patterns, such as in working areas or areas where persons travel through, such as train stations or airports and the like.

Referring now to FIG. 1 the repeater-based cellular switching apparatus 10 is associated with a repeater complex containing one or more repeaters servicing one or more indoor or outdoor coverage zones. In the preferred embodiment of the present invention the apparatus 10 is installed in order provide cellular switching between an indoor location containing one or more indoor coverage zones located in an architectural structure. The architectural structures could be used as the supporting and covering structure to a, housing complex, a hospital, a university campus, an entertainment center, transportation hub, such as an airport, a shopping mall, and the like. The apparatus 10 includes one or more directional outdoor/donor antennas 36, 38, and 40 aiming to different cellular donor sites (not shown), an antennas switch 12, a cellular modem 14, an RF DSP-based signal processor 16, a system controller 18, an indoor zone selection switch 20, and several repeater devices 24, 26, 28 servicing several zone indoor antennas 30, 32, and 34. The apparatus 10 further includes an oscillation detection and prevention device (not shown) and a noise jamming device. The donor antennas 36, 38, and 40 are oriented to provide antenna beams directed toward preferably neighboring pre-defined cellular donor sites (not shown). The donor antennas 36, 38, 40 are connected to the antennas switch 12. The function of the antennas switch 12 is to implement the optimal switching patterns in order in order to achieve cellular switching between the indoor coverage zones (not shown) and the cellular donor sites (not shown). The antennas switch 12 is linked an RF coupled port to the cellular modem 14, to the RF DSP-based signal processor or the controller device 16, and to the system controller 18. The indoor zone selection switch 20 is linked to several RF repeaters 24, 26, via the indoor zone selection switch 20. The function of the indoor zone selection switch 20 is to assign one or more repeaters to the antennas switch 12. The indoor zone selection switch 20 is linked via standard RF connections to indoor zone antennas 30, 32, and 34 respectively. The indoor zone antennas 30, 32, and 34 are oriented to provide antenna beams directed into the interior portion of the architectural structure where each antenna 30, 32, 34 covers a specific coverage zone. The cellular switching apparatus 10 is linked to mobile cellular units (not shown) operating within the indoor environment via the indoor antennas 30, 32, 34 and an air interface. When the mobile devices (not shown) are active within the coverage zones (not shown) uplink cellular traffic is transmitted and downlink cellular traffic is received to/from the indoor antennas 30, 32, 34. Via the indoor zone selection switch 20 the donor antennas are linked to the RF repeaters 24, 26, and 28 respectively in order to connect each time a different donor antenna to a different mobile antenna or antennas. The repeaters 24, 26, and 28 are conventional RF repeaters configured to provide bidirectional exchange of radio frequency signals between the indoor antennas 30, 32, 34 and the outdoor donor antennas 36, 38, and 40. Repeaters device 24, 26, 28 are capable of controlling analog or digital amplification/reduction and amplification ratios in the transmission channels, such as the uplink (UL) and the downlink (DL) channels. Note should be taken that in other preferred embodiments of the present invention additional or alternative components could be used. Cellular modem device 14 is preferably a fast cellular modem operating under the cellular site's technology. The modem device 14 is linked to the system controller 18 and to the antennas switch 12 via an RF coupled port. The functionality of the cellular modem device 14 is to measure cellular traffic load and the capacity load of one or more pre-defined cellular donor sites via cellular traffic transmission channels, such as uplink channels and downlink channels and to transmit traffic load and capacity load measurement information to the system controller device 18. The cellular modem device 14 operates by comparing a current traffic load level with the maximum possible traffic capacity load. The system controller device 18 is preferably a microprocessor equipped with a memory device. The system controller device 18 is connected to the cellular modem 14 and to the antennas switch 12 via the RF coupled port. The functionality of the system controller device 18 is to receive traffic load level and capacity load measurements from the modem device 14 or alternatively from the RF DSP-based signal processor or the controller device 16, and to analyze the traffic load level and capacity load measurements. The analysis involves calculations and comparisons of traffic load levels weighed with capacity load values among the monitored pre-defined donor cellular sites (not shown) In the analysis stage the system of the present invention determines if the traffic load or capacity load exceeds a predetermined threshold based on measurements performed. Thus, if for example, the apparatus 10 measured in the uplink the number of connections and disconnections of sessions, and these exceed a pre-determined threshold, then the system of the present invention will determine that there exists a traffic load. Likewise, the system can perform the analysis on any of the characteristics of traffic load or capacity load in a cellular donor site, include the signal strength, available resources, rate based usage, the bandwidth available and used, the number of calls in progress, the number of calls made over time, the number of connections or disconnections, the level of use of each donor site or each outdoor donor antenna, the capacity of each antenna, repeater or cellular donor site to handle traffic, the call/site/antenna loss ratio or error rates or delay variation or misinsertion rate, congestion level over time, statistical characteristics of the channels, the signal to noise ratio in each antenna device or each donor site, and the like. Each one and any combination of the above parameters could be analyzed, specific thresholds could be determined and thus determining the traffic load and the capacity load in the examined cellular donor site measured. Persons skilled in the art will appreciate the other parameters and characteristics of the measured donor sites that can further indicate the cellular wireless traffic load or capacity load, which are also contemplated and are covered by the present invention. The results of the analysis produce routing instructions based on the traffic load levels and the capacity loads of the monitored pre-defined cellular donor sites. Alternatively, the measurement functionalities of the cellular modem 14 could be replaced by the RF DSP-based signal processor 16 containing a functionally interrelated set of DSP routines. The functionality of the RF DSP-based signal processor or the controller 16 is practically identical to the functionality of the cellular modem device 14. The DSP signal processor 16 measures loads in the downlink (DL) channel and the uplink (UL) channels. The DSP signal processor 16 could be implemented either as a set of inter-related software programs or as a set of hardwired instructions embedded within integrated circuits or similar hardware components. Where the network implements the TDMA or the GSM technology the DSP signal processor 16 implements spectral analysis over time or over frequency. For the CDMA technology Peak-to-Average ratio measurements are used. The antennas switch 12 is an RF switching matrix which is capable of routing several optional cellular donor sites to several optional indoor coverage zones. Indoor zone selection switch 20 is an RF switching matrix. Switch 20 is responsible for switching one or more conventional RF repeaters 24, 26, and 28 to the antennas switch 12 and from there to one of the donor antennas 36, 38, 40 pointed to one of the pre-defined cellular donor sites. Consequent to the traffic load level and capacity load measurements of the cellular donor sites, the suitable calculations concerning of and comparisons between the cellular donor sites, a switching pattern is established by the system controller device 18. Such a switching pattern implemented by the antennas switch 12 could effect the routing of the cellular traffic from the RF repeaters 24, 26, 28 to one or more selected donor antennas 36, 38, 40 and there from to one or more cellular donor sites. Oscillation detection and prevention device (not shown) is a circuit that is responsible for the prevention of oscillations due to poor isolation between the donor antennas and the antennas of the mobile devices transmitting from an indoor coverage zone. Oscillation detection and prevention device (not shown) includes a microprocessor which samples the strength of the cellular signal in the uplink and the downlink and based on the signal strength ratio amplifies or reduces the strength of the signal. The system could also communicate with the cellular network operator via the cellular modem 14 that enables the system to receive directions and critical parameters from the cellular network operator.

Next the method operation of the repeater-based cellular switching system will be described. The repeater-based cellular switching system continuously monitors the traffic load and the capacity load of the uplink channels in order to measure the traffic loads generated by indoor coverage zones. The cellular switching system also monitors the traffic load and the capacity load in downlink channels associated with of two or more cellular donor sites that are pre-assigned for monitoring and for participation in the cellular switching scheme. The monitoring of the uplink channel involves traffic load measurements of the cellular traffic received from mobile units active in the indoor coverage zones through the indoor antennas. The monitoring of the downlink channels involves traffic load and capacity load measurements of cellular traffic received from the pre-assigned cellular donor sites via the outdoor donor antennas. The traffic measurements are performed by wireless traffic measuring devices, such as a modem device or an RF DSP-based signal processor device. The analysis of the measured values is performed by the system controller device. The analysis involves suitably weighted calculations and subsequent comparisons of the traffic load values of the pre-assigned cellular donor sites in order to determine the degrees of the cellular donor site's utilization. Consequent to the sensing of excessive traffic load on a cellular donor site the load on the overloaded site is reduced by the switching of the cellular traffic from the RF repeater to one or more cellular donor antennas associated with one or more alternative under-utilized cellular donor sites. The switching of repeaters is accomplished by suitable routing instructions delivered from the system controller to the antenna switch and by the modification of the switching patterns by the antenna switch. As a result when the load of the uplink cellular traffic increases and overloads or potentially overloads the cellular donor site to which it is routed, the cellular switching system is capable of re-routing the cellular traffic to one or more alternative cellular donor sites having a lower traffic load and/or a higher load capacity. The routing instructions provided will include instructions to alter the used routing or switching commands in operation, also by routing specific outdoor donor antennas to specific donor sites at specific times or by routing specific donor sites to specific indoor zones to be covered so as to allow for the balancing of the traffic load across the cellular network.

It will be appreciated by persons skilled in the art that the present invention is not limited to what has been particularly shown and described hereinabove. Rather the scope of the present invention is defined only by the claims which follow.

The invention claimed is:

1. In a cellular communications network a method for repeater-based cellular coverage switching across cellular donor sites, the method comprising:
    measuring the capacity load of at least two cellular donor sites;
    determining an at least one cellular coverage switching scheme based on the measured capacity load of the at least two cellular donor sites;
    setting up an at least one cellular coverage switching configuration in accordance with the at least one cellular coverage switching scheme; and switching the cellular traffic to an at least one cellular donor site in accordance with the at least one cellular coverage switching configuration;
    wherein a modem device performs the measuring of capacity load of at least two cellular donor sites.

2. The method of claim 1 further comprises analyzing the results produced by the measurements of the capacity load of the at least two wireless sites.

3. The method of claim 1 further comprises comparing the capacity load measurements of the at least two cellular donor sites.

4. The method of claim 1 further comprises measuring the cellular traffic load associated with an at least one indoor coverage zone.

5. The method of claim 1 further comprises introducing into the analysis of the capacity load measurement results the cellular traffic load measurements as weighing factors.

6. The method of claim 1 further comprises communicating with a cellular operator for receiving directions and critical parameters.

7. The apparatus of claim 6 wherein the transmission channel is a downlink channel.

8. In a cellular communications network an apparatus for repeater-based cellular coverage switching across cellular donor sites, the apparatus comprising: a capacity load measuring device linked to the cellular transmission channels and to a system controller device for measuring capacity load of at least two cellular donor sites and to transmit measurement information to the system controller device, a system controller device linked to the capacity load measuring device and to an antennas switch, to receive capacity load measurement information from the capacity load measuring device, to analyze the received information, to generate cellular traffic routing instructions, and to transmit the routing instructions to the antennas switch; and antennas switch linked to the system controller device and to outdoor donor antennas to receive cellular coverage switching instructions from the system controller and for coverage switching of the cellular traffic to an at least one cellular donor site:
    an oscillation detection and prevention circuit to prevent oscillations due to poor isolation between a mobile antenna and a donor antenna.

9. The apparatus of claim 8 further comprises antenna switch for the cellular coverage switching of an at least one indoor coverage zone to an at least one cellular donor site.

10. The apparatus of claim 8 wherein the capacity load measuring device is a Radio Frequency Digital Signal Processor device or a controller device.

11. The apparatus of claim 10 wherein the Digital Signal Processor/Controller device is a set of functionally inter-related software program modules or hardwired instructions embedded in integrated circuits.

12. The apparatus of claim 8 further comprises an at least one radio frequency repeater for providing bi-directional exchange of radio frequency signals between an indoor coverage antenna and an at least one outdoor donor antenna.

13. The apparatus of claim 8 further comprises an at least one indoor cellular coverage antenna.

14. The apparatus of claim 8 further comprises at least two outdoor donor antennas.

15. The apparatus of claim 8 wherein the transmission channel is an uplink channel.

16. The apparatus of claim 8 wherein the at least two cellular donor sites are pre-assigned to the cellular coverage switching apparatus for cellular capacity load monitoring and for cellular coverage switching.

17. The apparatus of claim 8 wherein the cellular coverage switching apparatus is associated with an indoor cellular site.

18. The apparatus of claim 8 wherein the cellular coverage apparatus is associated with a cellular base station.

19. In a cellular communications network an apparatus for repeater-based cellular coverage switching across cellular donor sites, the apparatus comprising: a capacity load measuring device linked to the cellular transmission channels and to a system controller device for measuring capacity load of at least two cellular donor sites and to transmit measurement information to the system controller device, a system controller device linked to the capacity load measuring device and to an antennas switch, to receive capacity load measurement information from the capacity load measuring device, to analyze the received information, to generate cellular traffic routing instructions, and to transmit the routing instructions to the antennas switch; and antennas switch linked to the system controller device and to outdoor donor antennas to receive cellular coverage switching instructions from the system controller and for coverage switching of the cellular traffic to an at least one cellular donor site:

wherein the capacity load measuring device is a modem device.

* * * * *